Sept. 15, 1953 P. W. CALHOUN 2,651,981
CAMERA SUPPORT
Filed Nov. 30, 1950

P. W. Calhoun
INVENTOR
BY *Calhoun & Co.*
ATTORNEYS.

Patented Sept. 15, 1953

2,651,981

UNITED STATES PATENT OFFICE 2,651,981

CAMERA SUPPORT

Paul W. Calhoun, Gainesville, Fla.

Application November 30, 1950, Serial No. 198,423

1 Claim. (Cl. 95—86)

This invention relates to camera holding devices. More particularly, the invention has reference to a device of the indicated type adapted to maintain a camera against excessive movement while making instantaneous i. e. snapshot exposures or exposures of relatively long duration.

By way of background, it is believed worthy of observation, in pointing up the problems which have heretofore existed, that the arms and hands are physiologically constructed for high mobility rather than to be "set" in a given position over an appreciable length of time. Thus, it is well known that when one raises his arms to hold the hands elevated over a period of time, the muscles are placed under an appreciable tension. As a result, the hands are in a constant state of tremor which, while not noticeable to the casual observer, nevertheless presents considerable difficulties where one is taking a photograph with a camera held in the hands. This state of tremor can never be entirely eliminated, although it is a fact that particularly in the case of professional camera men, considerable practice will enable one to reduce it considerably.

From this, it is seen that a camera held in front of the face is in point of actual fact roughly comparable to a weight attached to one end of a spring whose other end is rigidly mounted, the weight being subject to varying resilient forces, such as those produced by the impact of a brisk and variable air current. Under these conditions a certain amount of vibration results and it is a fact that increasing the tension of the spring would tend to reduce the amplitude of the vibration, but would at the same time increase its rate.

In like manner, a camera held aloft in the hands vibrates constantly, muscular tension never being constant for more than brief periods of time. Gripping the camera more tightly increases its frequency of vibration with the result that blur during exposure is, in general, increased rather than decreased thereby.

It is common practice, as for example among professional news camera men, to press the camera against the face, but this represents only a partial solution to the difficulty, since the fleshy part of the face is interposed directly between the camera and the bony structure of the skull, so that there is in effect a soft and resilient cushion between the camera and said bony structure. Camera vibration is reduced by this practice, but it does continue to persist to a detrimental extent, for any but very short exposures.

Cameras held at approximately waist level and viewed from above are likewise subject to almost constant movement from muscular tremor, though perhaps to a lesser extent than where the camera is held before the face. In view of this problem which has heretofore existed, I propose through the instant invention to enable users of small cameras to reduce camera movement during exposure to a minimum by means of a light, compact, and highly portable device which in use will constitute a direct, rigid connection between the camera and the skull, thus to employ in an effectual manner the inherent steadiness of the head to prevent excessive camera movement during the making of exposures.

A further important object is to provide a device of the type stated that will be attachable to conventionally constructed cameras without necessity of modification of the camera construction.

Another important object is to provide a device as described which is attachable to and detachable from a camera with speed and facility.

Still another object is to provide a camera-supporting device capable of manufacture at low cost, and constructed in a manner to permit its manufacture at low cost and with a minimum of parts simply arranged.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 1:
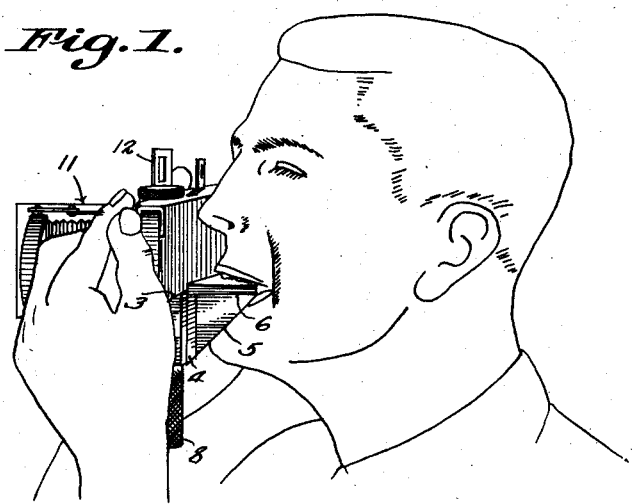
Fig. 1 is a perspective view of the camera support and of a camera mounted thereon, as said support appears when in use.
Figure 2:
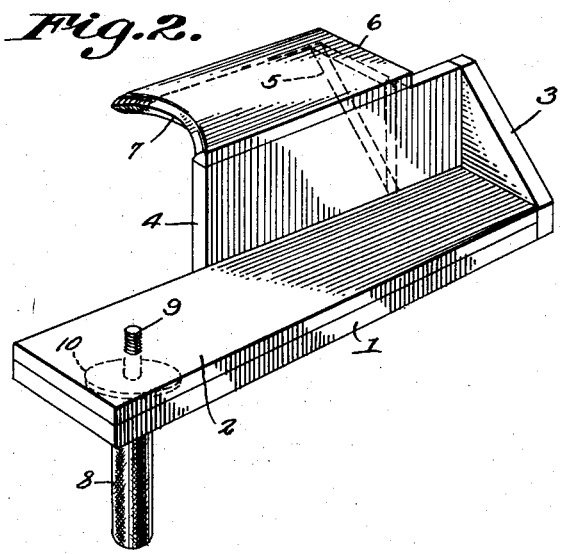
Fig. 2 is an enlarged perspective view of the device alone.

Referring to the drawings in detail, the device includes a shelf or ledge which, in the present instance, comprises a flat plate member 1. The thickness of the ledge can be increased if desired, by positioning a plate 2 on the plate 1. The plates 1 and 2 are adapted to be formed from any suitable material, such as wood, metal, or one of the plastics. In the present instance the ledge is of substantially elongated rectangular outer configuration, but I believe that without departure from the spirit of the invention as claimed, variations in this particular shape are possible and may in fact be desirable according to the particular size and make of camera to be supported. Plate 2 is not a permanent part of the dentapod but is easily removable so the camera may be made to rest lower on the assembly if desired, or a thicker member may be substituted for it to raise the camera.

At one end of the ledge, there is rigidly secured thereto an end brace 3 here shown as a triangular member formed as an upstanding end wall upon the supporting ledge, said reinforcing brace being rigidly secured to an upstanding rear wall 4 also of rectangular construction, and rigidly secured to the back edge of the supporting ledge. As may be noted, in the embodiment shown the supporting ledge projects at its other end a substantial distance beyond said rear wall 4. This provides free access to that part of the back of the camera carrying the window through which the film exposure numbers are read, for the particular type of camera for which this device was constructed. It further permits the camera to be held a little closer to the face of the user than would be possible if wall 4 extended the full length of member 1.

A rear brace 5 also of triangular plate-like construction is rigidly secured to the back surface of the wall 4 intermediate the opposite ends of said wall 4, and projects rearwardly from the wall 4 so as to support the mouthpiece 6 rigidly secured to the top edge of the wall 4 and formed at one end with the inwardly curved end edge 7 which can be beveled if desired.

The projecting end of the supporting ledge is provided with a depending knurled attachment screw 8 having the threaded upper end 9 projecting above the supporting ledge, there being a clamping collar 10 mounted upon the attachment screw and disposed below the supporting ledge. It will be understood that in view of the fact that plate 2 in effect adds to the thickness or height of the ledge, the collar 10 is adjustable longitudinally of the screw 8, so that the screw or bolt 8 can be made to reach the proper distance into the camera tripod socket in any case.

A camera has been generally designated 11, and is provided with the view finder 12. A camera of this type, as will be appreciated, is most usually provided with the threaded bottom opening, not shown, positioned to receive a threaded member such as the screw 9. This to adapt the camera for mounting upon an ordinary tripod. In the present instance, I make use of this construction for permitting the attachment of the camera 11 to the projecting end portion of the supporting ledge, the screw 9 threading into the camera and securing the camera rigidly to said supporting ledge. With the camera so secured, the mouthpiece 6 is inserted partially in the user's mouth, with the indented end edge 7 fitting against one end of the mouth opening, and with the mouthpiece being clamped between the user's teeth. Obviously, the surface of the mouthpiece may be formed with tooth-receiving impressions or the like, if desired.

I believe it will be apparent that when the camera is rigidly secured to the device constituting the present invention, and the mouthpiece clamped tightly between the teeth, the device in effect becomes a rigid connection extending directly between the camera and the skull structure of the head, and as a result, the camera is steadied to an appreciable extent.

Of further importance, in this connection, is the fact that the view finder 12 will, when the mouthpiece is clamped between the teeth, be positioned on a level with one eye, as readily seen from Fig. 1, so that the subject to be photographed is readily found and the exposure made.

While the device as herein illustrated and described is of simple construction and without adjustments, I believe it will be readily apparent to one skilled in the art that its general appearance and adaptation can be modified considerably, within the scope of the appended claims, without departure from the spirit of the invention.

What is claimed is:

A camera support comprising an elongated substantially rectangular ledge, a camera attaching screw carried by and extending through the ledge adjacent one end thereof, an elongated rectangular wall carried by the ledge and extending upwardly therefrom adjacent one longitudinal side edge thereof, said wall being of less length than the ledge and having one end spaced from the camera attaching screw to provide clearance for a camera resting on the ledge, a mouth piece carried by the wall adjacent its upper edge and extending outwardly from said wall in a direction opposite the ledge, said mouth piece being adapted to enter the mouth of the user and to be clamped between the teeth of the user while taking a picture, and means detachably supported on the ledge between the camera and the ledge for positioning the view finder of the camera at the eye level of the user.

PAUL W. CALHOUN.

References Cited in the file of this patent

UNITED STATES PATENTS

| Number | Name | Date |
|---|---|---|
| 2,072,390 | Hartingsvelt | Mar. 2, 1937 |